United States Patent [19]
Pieczulewski

[11] 4,353,271
[45] Oct. 12, 1982

[54] MULTIPLE POSITION ROTARY INDEX TABLE

[75] Inventor: Daniel J. Pieczulewski, South Lyon, Mich.

[73] Assignee: A.G. Davis Gage and Engineering Co., Hazel Park, Mich.

[21] Appl. No.: 149,906

[22] Filed: May 15, 1980

[51] Int. Cl.$^3$ .............................................. B23Q 17/02
[52] U.S. Cl. ...................... 74/826; 74/813 L
[58] Field of Search ................. 74/826, 813 L, 813 R, 74/817, 827

[56] References Cited

U.S. PATENT DOCUMENTS

| | | | |
|---|---|---|---|
| 3,667,305 | 6/1972 | Rasoira | 74/813 L |
| 3,861,245 | 1/1975 | Jauch et al. | 74/813 L |
| 3,941,014 | 3/1976 | Benjamin et al. | 74/826 |

Primary Examiner—Kenneth Dorner
Attorney, Agent, or Firm—Remy J. VanOphem

[57] ABSTRACT

A precision rotary indexing fixture is disclosed of the type including a top plate adapted to have work pieces mounted thereon with the work plate indexed to any of a plurality of precision rotary positions. The precision locking of the top plate is achieved by serrated coupling rings, one mounted on the outer periphery of the top plate, the other mating ring mounted on a base structure. The top plate is locked in various index positions by the application of disc spring sets acting on the top plate through an annular piston and a set of bearing elements mounted in opposed grooves in the piston and a race ring mounted to the top plate. The fluid forces acting on the piston acts to release the locking pressure exerted by the disc spring sets and release the coupling serration engagement during indexing of the top plate. The annular piston and disc spring sets act on the top plate in a position closely adjacent to the coupling ring radial location to minimize bending deflection of the top plate upon the application of locking forces by the disc spring sets. The use of a disc spring set to carry out locking of the top plate provides a fail-safe feature to lock the top plate in the event of a power failure or other malfunction causing loss of hydraulic or pneumatic actuating pressure.

15 Claims, 9 Drawing Figures

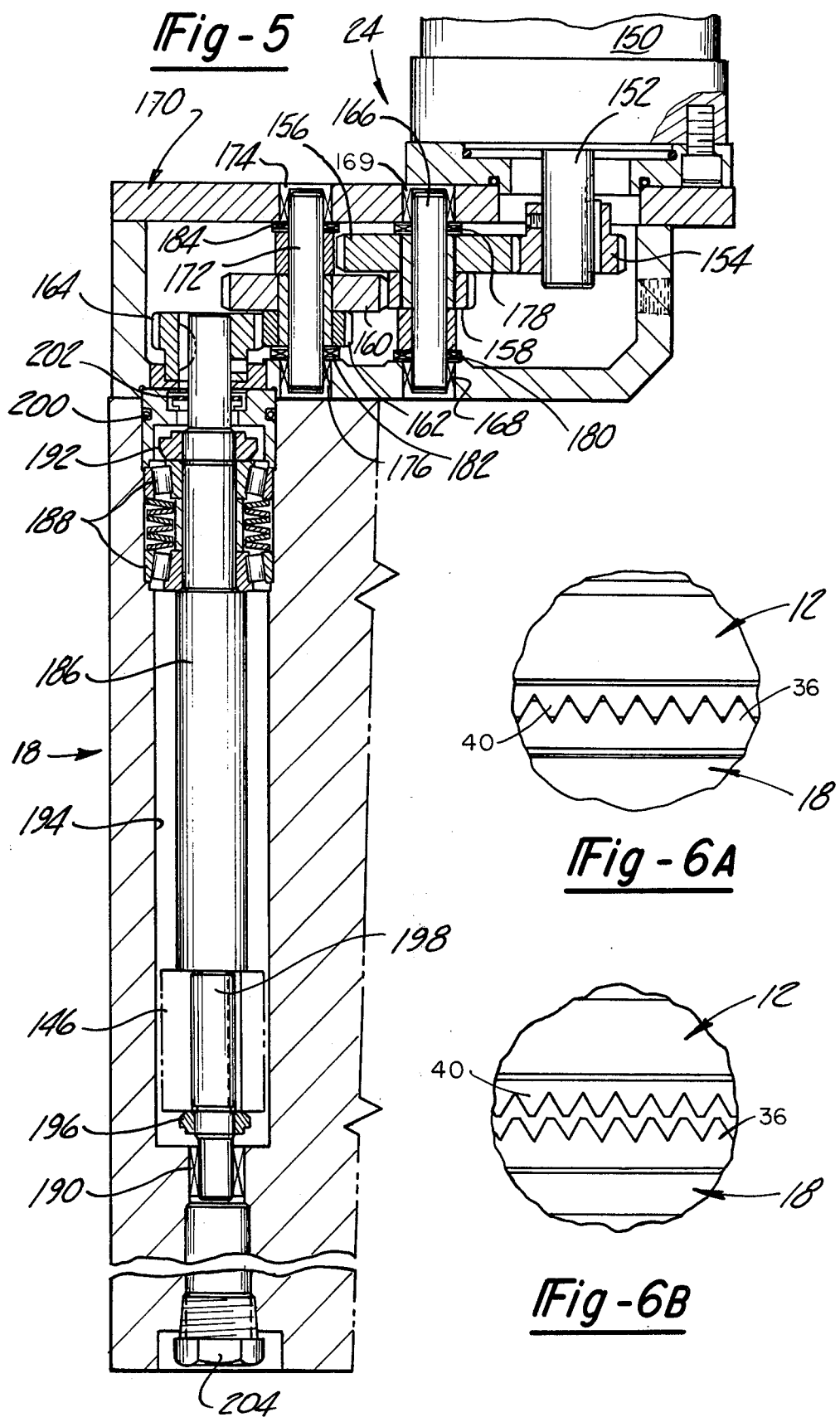

MULTIPLE POSITION ROTARY INDEX TABLE

BACKGROUND OF THE INVENTION

This invention concerns rotary index tables and more particularly, precision rotary indexing fixtures utilized to carry out precision machining of work pieces, such as are used with numerically controlled machine tools. Such rotary index tables are very commonly employed in machining work pieces in order to carry out boring, grinding, drilling, and other operations on a work piece successively positioned at various angular positions with respect to the machining spindle. As noted, the precise position of the work piece must be carefully controlled during the indexing in order to maintain accuracy of the machining process being performed on the work piece.

It has heretofore been known and employed to use a rotary indexing table of a type using a Hirth coupling, comprising mating rings formed with serrations, one fixed to indexing top plate and the other to a stationary base structure. In operation, during indexing, the top plate is lifted clear of the serrations, indexed to the next indexed position, where it is caused to be lowered, such that the Hirth coupling teeth are again in meshing relationship. This securely locks the top plate in the indexed position.

This arrangement has been highly advantageous due to the precision afforded in controlling the angular position of the table in any indexed position. This precision arises due to the averaging effect of the serrations, in which the machining inaccuracies of the serration teeth are averaged out over the entire ring series, to thus provide a precision which is much greater than that with which the individual gear teeth can be manufactured. Another characteristic of the Hirth coupling is that the accuracy tends to improve with wear, the teeth becoming more and more uniform after repeated indexing cycles. These indexing tables were originally mounted for indexing rotation about a vertical axis and the weight of the top plate utilized to hold the mating serrations in engagement. While suitable for relatively low tool cutting reaction forces, for significant machining forces, the serrations must be held in engagement with a locking force acting to increase the gravity induced engagement pressure between the mating serration teeth.

A typical arrangement of such locking indexing tables included an outer serration ring affixed to the top plate and a second ring typically located close to the periphery of the top plate and adapted to be placed in meshing relationship. The actuator, either mechanical, hydraulic, or pneumatic, is generally mounted centrally of the indexing axis, and commonly a central member is affixed to the center of the work table and caused to be elevated and/or a locking force applied thereto, usually hydraulically. This forces the serration teeth into tighter locking engagement in order to greatly increase the rigidity of holding the top plate in position during machining operations. The outward radial location of the serrations were employed since this maximized the stability of the support afforded by the Hirth coupling. That is, the ability of the coupling to resist forces acting on the top plate tending to tip or otherwise misposition the top plate was more easily resisted as the tooth location was moved further out from the axis of rotation of the table top plate.

On the other hand, the need to apply a locking force via the central hub, resulted in the application of considerable distorting stresses acting on the top plate due to the radial distance between the point of application of the force and the reaction forces acting through the Hirth coupling serrations. Such distorting force acts to move the work piece out of precise location and reduces the rigidity of the top plate in absorbing the forces generated during machining of the work piece.

Another problem is encountered with hydraulically operated indexing tables which are utilized when relatively high levels of locking forces are required. The locking arrangement heretofore utilized is that of a double acting hydraulic cylinder which holds the top plate in locking engagement with a ring of serrations fixed with respect to a base structure. In the event of power failure or hydraulic system failure, a loss of hydraulic pressure in the hold down cylinder will allow loosening of the work piece, in turn resulting in either scrappage of the work piece due to machining inaccuracies or a radical shift of the work piece causing damage to the machine tool and/or the index table itself.

Accordingly, it is an object of the present invention to provide a rotary precision index table of the type described including axially mating serrations carried by rings mounted respectively to the top plate and to a base structure which is located close to the extreme radial outermost location on the radius of the index table in which distortions of the top plate by applied locking forces are minimized.

It is another object of the present invention in which the operation is fail-safe to insure locking of the top plate even with a failure of pneumatic or hydraulic pressure.

SUMMARY OF THE INVENTION

These and other objects of the present invention are achieved by an index table in which the serrations are moved into and out of engagement by means of a spring applied hydraulic release arrangement in which an annular piston is provided, mounted on a central fixed hub member. The annular piston slidably receives a series of anchoring plugs extending therethrough and mounted to the base structure. The anchoring plugs are provided with a headed section on the remote side of the piston, each serving to anchor a set of locking spring discs, acting between the head of the anchoring plugs and pockets formed into the annular piston. The top plate is supported on rotary bearings consisting of a plurality of bearing elements disposed in opposed raceways, one formed on the outside diameter of the annular piston, the other raceway being fixed to the rotating top plate. The locking springs act through the piston and the bearing elements draw the Hirth coupling serrations on the top plate into locking engagement with corresponding serrations formed on a base plate.

Upon pressurization of the area behind the annular piston, the piston moves to compress and counter the force applied by the locking springs. Acting through the bearing elements, this causes the top plate coupling serrations to be lifted clear of the base coupling serrations and allows a rotary drive to index the top plate to the next indexed position. The use of such spring applied locking arrangement insures that in the event of power or hydraulic failure, the top plate will be securely locked into position to avoid the sudden inadvertent release of the work piece during machining operations.

The point of application of the spring, and hydraulic forces, i.e., at the radial location of the bearing elements is closely adjacent to the Hirth coupling serration teeth radial location, such that distortion in the top plate is held to minimal levels improving the accuracy with which the work pieces may be located thereon.

DESCRIPTION OF THE DRAWINGS

FIG. 5 is a sectional view through the rotary indexing table shown in FIGS. 1-4 depicting the gear train for the indexing drive arrangement.

FIGS. 6A and 6B are enlarged fragmentary views of the section 6—6 in FIG. 4 in the locking and released positions respectively.

DETAILED DESCRIPTION OF THE DRAWINGS

In the following detailed description, certain specific terminology will be employed for the sake of clarity and a particular embodiment described in accordance with the requirements of 35 U.S.C. 112, but it is to be understood that the same is not intended to be limiting and indeed should not be so construed inasmuch as the invention is capable of taking many forms and variations within the scope of the appended claims.

Figure 1:
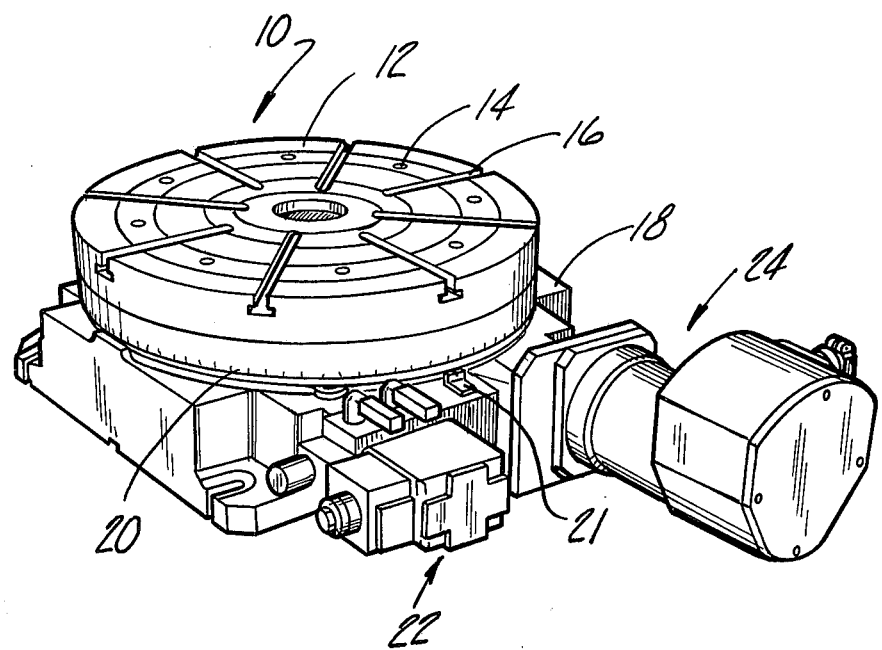
FIG. 1 is a perspective view of a rotary indexing table utilizing the design features according to the present invention with the top table mounted for indexing rotation about a vertical axis.
Figure 2:
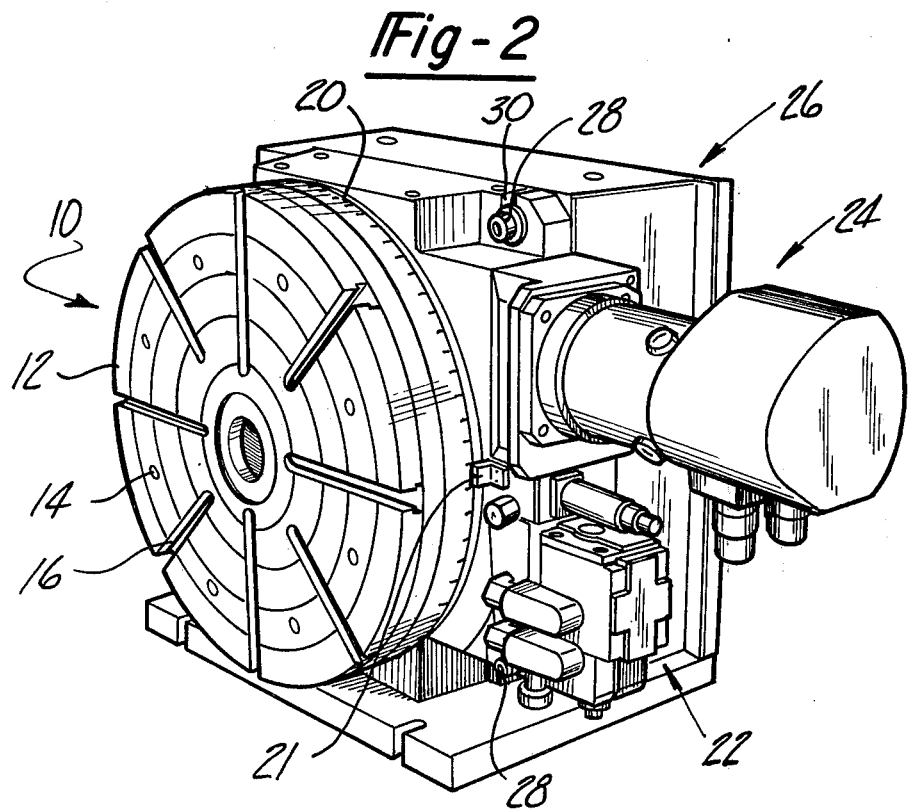
FIG. 2 is a perspective view of the rotary indexing table shown in FIG. 1 which is mounted for indexing movement about a horizontal axis.
Figure 3:
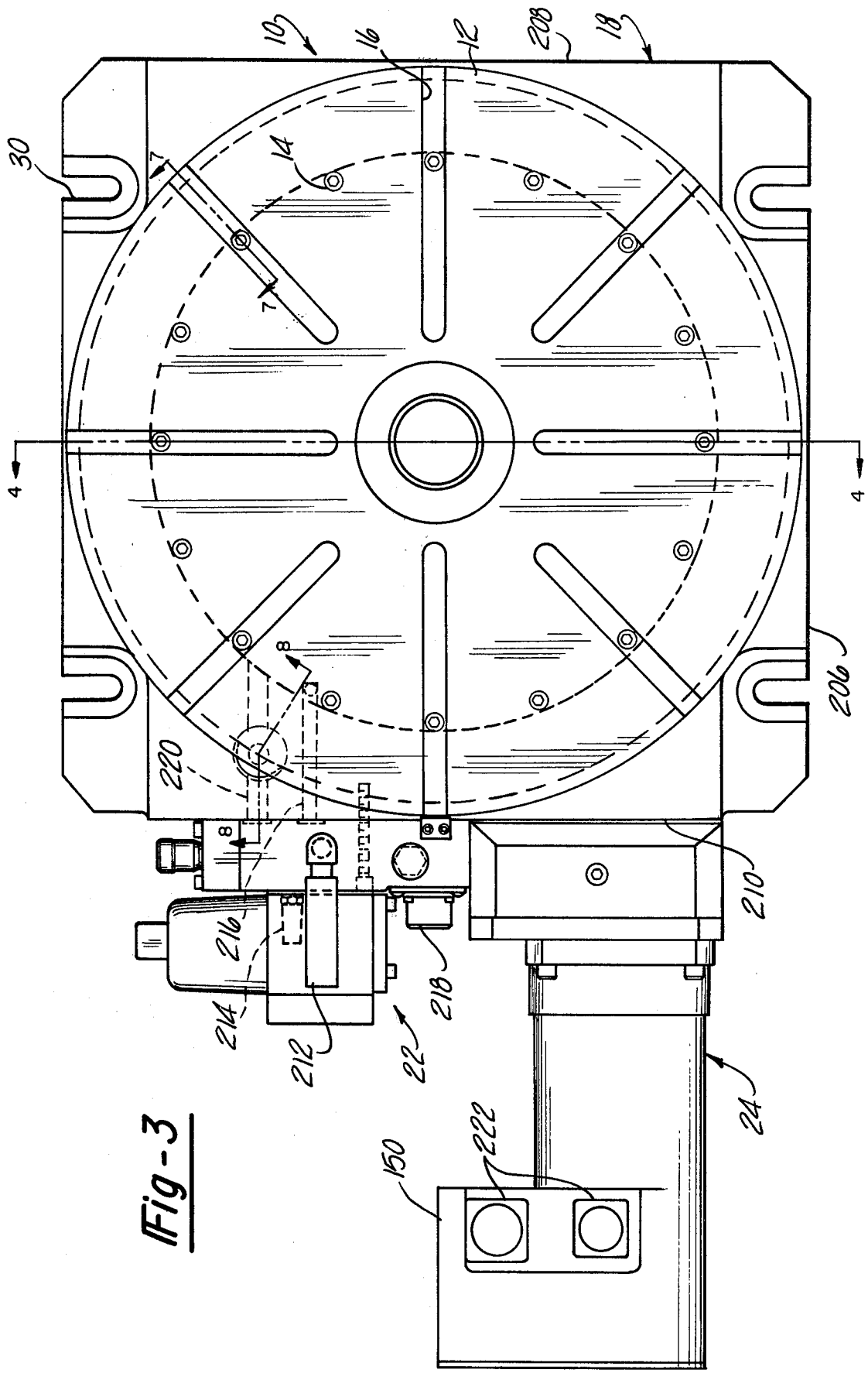
FIG. 3 is a plan view of the rotary indexing table shown in FIG. 1.

By referring to the drawings, and particularly FIGS. 1-3, the general configuration of the index tables according to the present invention can be understood. FIG. 1 shows the horizontal orientation in which the index table 10 having a generally circular top plate 12 is mounted for rotation during indexing about a vertical axis. The top plate 12 is provided with suitable mounting holes and slots 14 and 16, respectively in conventional fashion. A base structure generally indicated at 18 provides a support for rotatable mounting of the top plate 12 thereon. A scale ring 20 provided with a fixed indicator 22, providing an indication of the particular indexed position of the top plate 12.

The indexing tables according to the concept of the present invention are provided with a fluid actuation for releasing and raising the top plate 12 in order to provide rotation of the top plate 12 to the next indexed position. Such fluid power is controlled by the valving assembly generally indicated at 22 which admits fluid under pressure to a piston arrangement, as will be described, in order to carry out raising of the top plate 12. After such raising and release of the top plate 12, a rotary drive assembly 24 is activated either manually or integrated with machine controls to rotate the index table to the next index position.

Inasmuch as such valving and drive assemblies are essentially conventional, the details of the same will not be herein described, except insofar as relates to the integration of the same with the index table 10, as hereinafter set forth.

The indexing table is also adapted to be mounted in a vertical orientation, that is, for the indexing rotation of the top plate 12 about a horizontal axis by mounting the base structure 18 to a special vertical mounting bracket and base plate assembly as indicated at 26. The suitable mounting cap screws 28 cooperates with the mounting slots 30, to so mount the base structure 18.

Figure 4:
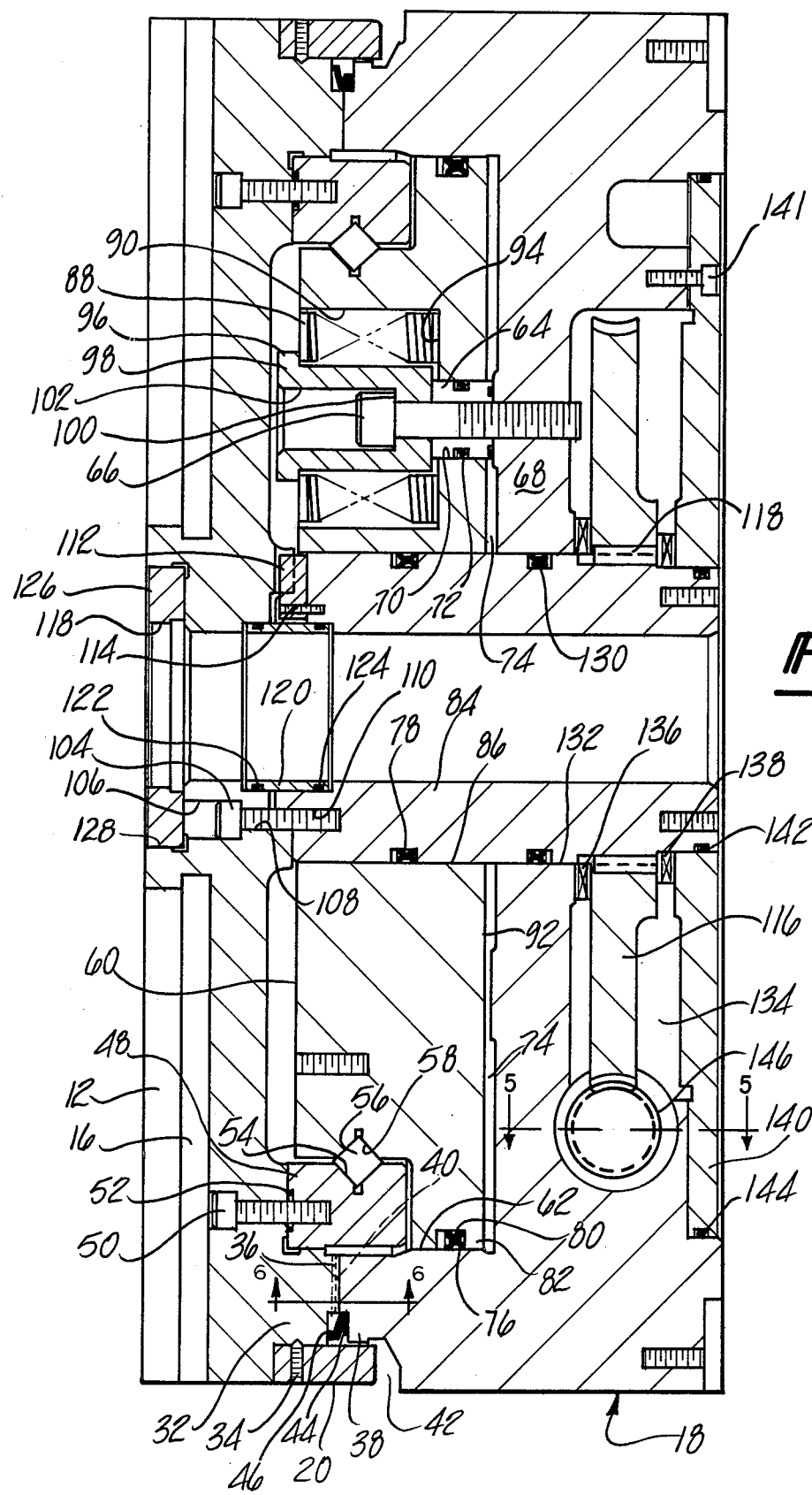
FIG. 4 is a sectional view taken along line 4—4 in FIG. 3.

Referring to FIG. 4, the details of the top plate 12, the base structure 18, and the mounting, drive, lock and release arrangements are revealed, as well as the index-locating means. The top plate 12 is formed with a downwardly extending skirt portion indicated at 32 which is of circular shape in conformity with the periphery of the top plate 12. Immediately adjacent the skirt 32 and radially outward thereof is mounted the scale ring 20 secured by means of a plurality of allen set screws 34 to the outer face of the skirt section 32.

Machined into the axially remote surface of the skirt 32 is a series of serrations 36, the flanks of which extend in a generally radial direction with respect to the axis of rotation of the top plate 12. The base structure 18 also includes an upwardly projecting rim 38 extending in alignment and in opposition with the skirt segment section 32 and is likewise formed with corresponding mating serrations 40 which act when engaged to accurately locate the top plate 12 angularly with respect to the fixed base structure 18 in the manner known in the art. This arrangement constitutes what is known in the art as the Hirth coupling referred to above.

It can be appreciated that the coupling location is near the radially outermost location with respect to the top plate and base structure 18 such as to insure the maximum possible lever arm measured outwardly from the axis of the top plate that is available to resist the machining forces. The scale ring 20 extends into an axially extending relief 42 formed into the outer surface of the affixed base structure 18 adjacent the rim 38 such as to provide overlapping of the scale ring 20 and shield the interior space between the affixed base structure 18 and a top plate 12, minimizing the entrance of coolant, chips, grinding swarf, etc.

In addition, an outer rim seal 44 is provided which has a movable lip 46 which enables the axial space between the opposed surfaces of the skirt 32 and rim 38 to move relative to each other axially while still maintaining a reliable seal therebetween to reliably prevent the entrance of the aforementioned contaminants from entering into the interior working components of the table and particularly between the Hirth coupling teeth 36 and 40.

The top plate 12 also has affixed to it a circular race ring 48 by means of a series of cap screws 50 passing into bores extending from the bottom surface of the grooves 16 into the upper surface of the rim race ring 48. A suitable "O" ring seal 52 is provided to also insure the sealing of the interior of the table.

The race ring 48 is formed with "V" groove raceway 54 in which are disposed a series of rollers 56 which rotate about an axes at a 45 degree angle to the axis of rotation of the top plate 12 when rotating on the rollers 56. The rollers 56 are also received in a corresponding "V" groove raceway 58 machined into the outer periphery of a nonrotating annular piston 60 which is mounted within a bore 62 machined into the fixed base structure 18 aligned with the axis of rotation of the top plate 12 on the "V" groove rollers 56. The 45 degree inclination of the rollers 56 in the "V" grooves 58 and 54, enables both radial and axial forces to be transmitted thereby such that the top plate 12 is rotatably mounted on the fixed base structure 18 via the piston 60.

Alternative bearing configurations may of course be employed other than the rollers and "V" grooves, such as ball bearings disposed in semicircular raceways, which may afford better accuracy in some designs.

The piston 60 is mounted for slidable motion in the bore 62 during actuation but is rotatably fixed by means of a series of bushings 64. These are anchored on a corresponding series of cap screws 66 each of which pass through the interior of a bushing 64 and are threadably received in a web 68 formed in the fixed base structure 18. Each bushing 64 is received within one of a plurality of corresponding bores 70 formed about the axis of the piston 60 at a radially outward location. A pair of seals 72 are provided extending within recesses formed in each bushing 64 to prevent the bypass of fluid pressure exerted in a bore cavity 74, when pressurized with either hydraulic or pneumatic pressure during unlocking actuation of the table.

Suitable sliding seals 76 and 78 are also provided, seal 76 disposed within a recess 80 formed in a large stepped diameter section 82 of the piston 60 and in engagement with the bore 62 walls, with seal 78 received in a groove in central drive tube 84. The piston 60 is slidably mounted on its inner bore 86 over the exterior of the drive tube 84. Seal 78 is in a sealing contact therewith in order to prevent the loss of pressure in actuation chamber 74.

The relatively large diameter piston 60 afforded by the large diameter step 82 insures adequate operating pressures for either hydraulic or relatively lower pressure pneumatic operation.

The piston 60 is biased to the return or locking position in which the Hirth coupling teeth 36 and 40 are in engagement by a series of disc spring sets indicated at 88, each spring disc being annular in configuration. The disc spring sets are received within pockets 90 machined into the radial face of the piston opposite the piston face 92 on which pressure is exerted upon admission of the operating fluid into actuating chamber 74. Each of the annular disc spring sets 88 are seated on the bottom surface 94 of a respective pocket 90 and also are received beneath an enlarged head portion 96 formed on anchoring plugs 98. The anchoring plugs 98 are retained by the aforementioned cap screws 66 engaging a shoulder 100 located at the bottom of an interior bore 102 formed in each of the anchoring plugs 98. Thus, each spring set 88 is effectively anchored to the fixed base structure 18 at one end and to the piston 60 at the other.

The admission of fluid via the valving assembly 22 into the actuation chamber 74 causes the piston to move to the left as viewed in FIG. 4 compressing the disc springs 88. Accordingly, each of the disc spring sets 88 act to urge the piston 60 to the right as viewed in FIG. 4 with a fixed reaction point being provided by the anchoring plugs 98. The urging of the piston 60 in turn acts on the top plate 12 through axial loading of the rollers 56 and the "V" grooves 58 and 54, transmitting axial force thereinto. This in turn, causes the teeth 36 and 40 to move into meshing relationship.

Contrariwise, upon admission of fluid pressure into actuation chamber 74, the piston 60 moves to the left as viewed in FIG. 4, against the bias of the springs 88. Movement is thereby transmitted through the "V" grooves 58, 54 and the rollers 56, causing the table 12 to be lifted and cause separation of teeth 36 and 40. These respective positions of the Hirth coupling teeth 36 and 40 are depicted in FIGS. 6A and 6B.

Accordingly, it can be appreciated that the movement is fail-safe inasmuch as the springs 88 act to lock the top plate 12. If there occurs a failure of pressure from the hydraulic or pneumatic supply, such that pressure in actuation chamber 74 is relieved during machining operations, on a mounted workpiece, the top plate 12 will nonetheless remain securely and firmly locked in its indexed position.

It should also be noted that the transmission of the unlocking and locking forces is at a radially outward position closely adjacent to the radial position location whereat the Hirth serrations 36 and 40 are in mesh. This minimizes the deflection of the top plate 12 due to the application of the locking forces since the overhang therebetween is at a minimum. This in turn eliminates the tendency of the top plate 12 to be rendered concave upon the application of the locking forces and enables the top plate 12 to be directly utilized for the machining process since its surface will remain true.

The rotation of the top plate 12 is achieved by the aforementioned drive tube 84 which is affixed to the top plate 12 by a series of cap screws 104 arranged about the axis of the top plate 12 which pass into counterbores 106, body passages 108 and into threaded bores 110 formed in an end face of the drive tube 84 securing the same together for unitary rotation. The locating key 112 and dowel 114 insure precision location of the table 12 with respect to the drive tube 84 in order to appropriately locate the same with respect to a drive gear 116 keyed at 118 to the outside diameter of the drive tube 84. A sealing sleeve 120 is provided with sealed "O" rings 122, 124 again being utilized in order to insure that coolant, oil, etc. will not enter the interior of the index table 10. A cover ring 126 is also provided, received in a counterbore 128 and covering the tops of the counterbores 106 and presenting a relatively smooth upper surface with the top plate 12.

The drive gear 116 is mounted for slight axial movement to accommodate the relative upward travel of the table top plate 12 and connected drive tube 84 during unlocking axial movement thereof. A seal 130 is provided to seal the sliding space of the drive tube 84 in a bore 132 with the web 68 of the fixed base structure 18. The drive gear 116 is disposed in a cavity 134 formed into the bottom surface of the fixed base structure 18. Thrust bearings 136 and 138 accommodate the thrusting forces during rotation and serve to axially retain the drive gear 116 during axial travel of the drive tube 84. A cover plate 140 encloses cavity 134 with seals 142 and 144 again provided insuring a complete sealing of the interior of the table.

Also disposed in the cavity 134 is a worm gear 146 extending about an axis transverse to the axis of rotation of the top plate 12 and in mesh with the drive gear 116. Rotation of the worm gear 146 produces the corresponding rotation of the top plate 12 during indexing motion thereof. The cover plate 140 is secured by a series of cap screws 141.

By referring to FIG. 5, the rotary drive arrangement whereby the drive worm gear 146 is driven may be understood. The rotary drive assembly 24 includes a DC drive motor 150 having an output shaft 152 which drives a spur gear reduction gearing consisting of spur gears 154, 156, 158, 160, and 162 as well as 164. The spur gear 154 is keyed to the motor output shaft 152. Spur gears 156, 158 are rotatably supported on a pinion shaft 166 in turn supported on bearings 168, 169 in a gear housing 170. Similarly, pinion gears 162, 160 are supported on a pinion shaft 172 rotatably supported by bearings 174 and 176 in the gear housing 170. Thrust spacer bearings 178, 180, 182 and 184 are also provided. Spur gear 164 is keyed to a drive shaft 186, rotatably mounted in the fixed base structure 18 by means of bearing assemblies 188 and 190, the drive shaft being preloaded with a collar 192. The drive shaft 186 passes through a transverse bore 194 formed in the fixed base structure 18, a worm gear 146 being keyed to the far end of the drive shaft 186, a locknut 196 locking the worm gear 146 on the stub section 198 of the drive shaft 186. Suitable seals 200 and 202 insure that lubricant does not pass into the interior of the fixed base structure from the transmission housing 170. An inspection plug 204 is provided at the end of transverse bore 194.

The configuration of the fixed base structure 18 is such that the rotary drive assembly 24 and the valve assembly 22 may be mounted on any of the three side surfaces 206, 208, and 210; mounting to side 210 being shown. This is rendered possible by providing appropriate cross bores for the fluid passage openings and the cross bore to accommodate the drive shaft 186, in addition to suitable tapped hole patterns. The valve assembly 22, as noted, is mounted together with the drive package 24 as a unitary assembly for hydraulic applications.

For pneumatic type applications, there is shown in FIG. 3 a single inlet bushing 212 which places the fluid pressure supply into communication with an inlet passage 216, in turn in communication with the actuation chamber 74 to cause pressurization thereof upon activation of a suitable control to move the top plate 12 to a released position prior to activation of rotation by rotary drive assembly 24.

The valve assemblies 22 are comprised of conventional solenoid operated valves controlled by input electrical signals received over leads which may be connected by coupling 218.

Similarly, electrical fittings are provided in order to provide electrical connections to the DC motor 150. A suitable return line 220 either provides exhausting of the fluid from the exhaust chambers 74 to a return sump in the case of a hydraulically operated design, or merely to exhaust the air pressure via the muffler 214 for pneumatic type designs.

The index table 10 is usable with various types of automatic controls, such as to be integrated with NC controlled systems, CNC controllers or stand alone programmable controls or manual controllers.

Figure 7:
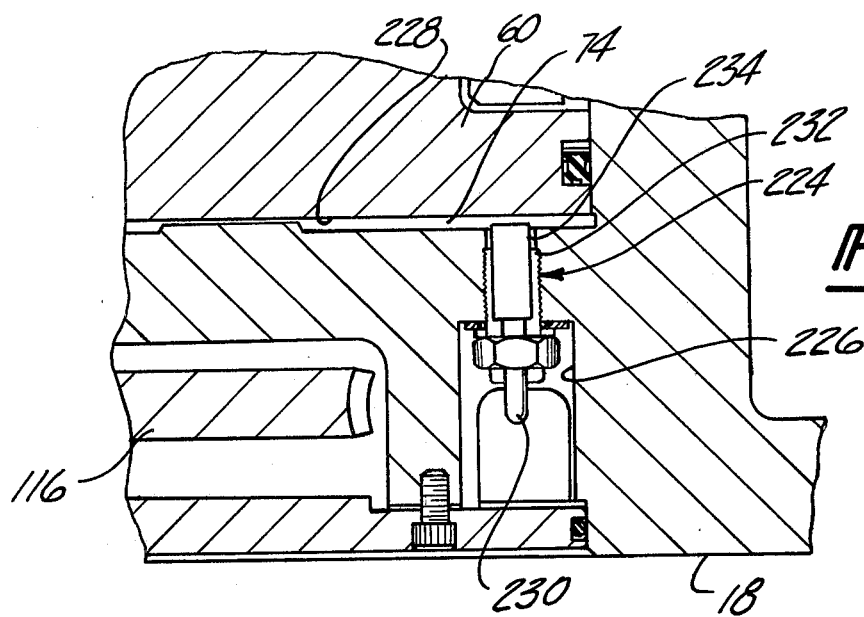
FIG. 7 is a fragmentary view of the section 7—7 of FIG. 3.

In FIG. 7, there is depicted a proximity detector 224, illustrated as received in a bore 226 formed in fixed base structure 18 opening into the actuation chamber 74 such as to be in an adjustable position with the pressurized face 228 of the piston 60, the proximity detector having suitable connections via line 230 to the electrical controls. The proximity detector may be adjusted in the threadable bore 224 by means of a threaded bushing 232 cooperating with a threaded exterior hub of 234 of the proximity sensor generally indicated at 224. A threaded adjustment enables a suitable clearance space between the piston while enabling a proximity sensor to detect the position of the piston. The piston 60, being mechanically joined to the table top plate 12 via the rollers 56, moves with the table and accordingly, axial movement of the piston 60 can verify the release of the Hirth coupling serrations 36 and 40 from engagement. Such proximity detector can be interlocked with the rotary controls in order to prevent the actuation of the rotary drive prior to release of the Hirth coupling from engagement.

Figure 8:
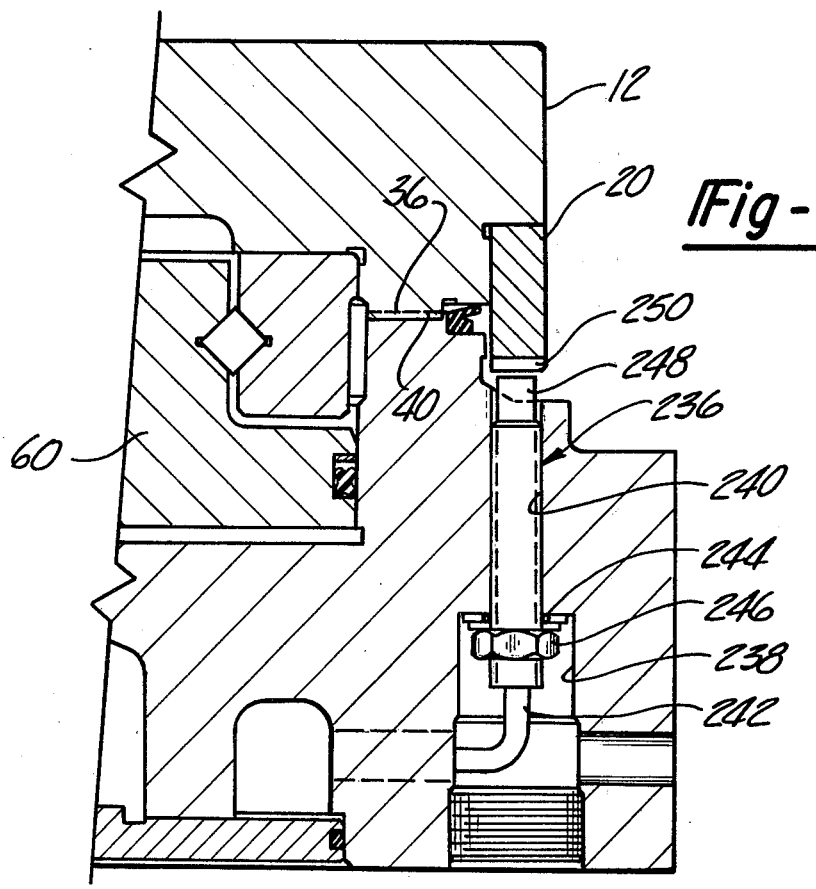
FIG. 8 is a fragmentary view of the section 8—8 of FIG. 3.

Also, a "zero" proximity detector can be provided as shown in FIG. 8. A proximity detector 236 is located in a counterbore 238 and having an extension probe thereof threadably engaged with a threaded bore 240 opening into the counterbore 238, suitable electrical connections being made via line 242. The seal 244 and locknut 246 are provided to anchor the proximity detector in an adjusted position. The upper probe end 248 of the proximity detector 236 is positioned beneath the scale ring 20 and may be sensitized to the presence of a "zero" tooth 250 machined into the scale ring 20 such that this enables a determination of the top plate 12 being in a zero degree reference position. Such electrical signal may be integrated with various automatic controls which will enable the top plate to be rotated until reaching the zero position and thence automatically relocked, being in the zero position at the beginning of each use of the index table 10.

Accordingly, it can be appreciated that by this arrangement the above recited objects of the present invention have been achieved, i.e. the application of the unlocking force is closely adjacent to the radial location whereat the Hirth coupling serrations are located, these serrations also being located advantageously in a radial outward position. These serrations are also directly formed on the top plate 12 and the base structure 18 such as to provide maximum rigidity in the locked position. The application of the locking forces being closely adjacent thereto precludes the development of concavity in the top plate 12. In addition, the arrangement whereby the piston 60 is urged to a locking position by the disc spring sets 88 insures a fail-safe operation. That is, the unintentioned loss of pressure in actuation chamber 74, does not result in a loosening or release of the table and mounted work piece which might otherwise occur during machining operations. The springs insure that in the event of lost pressure in the chamber 74, the top plate 12 is securely locked against rotation.

The overall configuration is of extreme rigidity and simplicity and is completely sealed such as to insure a high degree of reliability of operation of the unit. The drive packages and valve packages are mountable on any of three sides to provide a degree of flexibility for installation of such equipment in the most advantageous location for particular installation.

What is claimed is:

1. A rotary indexing table comprising:
a generally circular top plate;
a fixed base structure;
means mounting said top plate for rotation about an axis on said fixed base structure and limited axial movement relative said base;
indexing-locating means for positively locating said table top plate in any of a plurality of rotated positions about said axis of rotation;
means for selectively releasing said top plate from said indexing-locating means to enable rotation of said top plate to respective indexed positions rotated about said axis of rotation;
said indexing-locating means including a skirt portion formed on said top plate extending axially about the periphery of said top plate, said skirt portion being formed with a series of serrations extending radially along the axially most remote surface of said skirt portion; further including a corresponding rim portion formed on said fixed base structure and being formed with corresponding serrations to said top plate serrations extending radially outward and in opposition to said top plate serrations, said top plate and fixed base structure serrations being engagable with each other in each of said plurality of indexed positions upon axial movement of said top plate into engagement toward said base structure;

said indexing-locating means further including means applying a locking force acting between said top plate and said fixed base structure forcing said serrations into engagement thereof; and said indexing-locating means also including a piston having an outside diameter slidably mounted in a bore formed in said fixed base structure, bearing means acting between said outside diameter of said piston and said top plate, said bearing means including an outer raceway carried by said top plate, said bearing means having means absorbing radial and axial loads to establish an axial driving connection between said piston and said top plate causing said piston and said top plate to move together axially while allowing relative rotation therebetween, means for exerting locking and releasing forces on said piston, whereby said piston exerts a locking and releasing force on said top plate through said bearing means.

2. The rotary index table according to claim 1 wherein said bearing means outer raceway is immediately adjacent to said serrations, whereby said engagement force application produces only minimal deflection on said top plate.

3. The rotary index table according to claim 1 wherein said bearing means includes an inner raceway comprising a groove formed in the periphery of the outer diameter of said piston and wherein said outer raceway comprises a corresponding oppositely located groove formed in a bore extending below said top plate; said bearing means further including a plurality of bearing elements disposed in said grooves thereby producing said driving axial connection between said piston and said top plate.

4. The rotary index table according to claim 1 wherein said means for producing said releasing force on said piston comprises a fluid pressure chamber located in a piston face opposite said rotary bearing means and further including means for introducing fluid under pressure into said actuating chamber causing a force to be generated on said piston tending to move said top plate to said release position.

5. The rotary index table according to claim 4 further including spring means acting on said piston in a direction opposite to said force produced by said introduction of pressure in said fluid pressure chamber whereby said piston is urged to said locking position by said spring means.

6. The rotary index table according to claim 5 wherein said spring means includes a plurality of anchoring plugs extending into bores formed in said piston and means anchoring said anchoring plugs to said fixed base structure preventing relative rotation therebetween; said spring means further including spring members acting between said anchor plugs and an adjacent end face of said piston urging said piston to said locked position.

7. The rotary index table according to claim 6 wherein said spring members are comprised of sets of annular spring discs surrounding each of said anchoring plugs, each of said anchoring plugs being formed with a shoulder and with each spring disc set acting on said shoulder.

8. The rotary index table according to claim 1 further including means for rotating said top plate with said coupling serrations disengaged, said means comprising: a drive sleeve affixed to said top plate and extending through a bore formed in the central part of said piston, said piston being thereby annularly configured to receive said drive sleeve; and means for rotating said drive sleeve to rotate said top plate.

9. The rotary index table according to claim 8 wherein said drive sleeve extends through a bore formed in said fixed base structure after passing through said bore and said piston; a rotary drive gear affixed to said drive sleeve, said rotary drive gear disposed in a cavity formed in said fixed base structure into which said rotary drive sleeve extends.

10. A rotary index table according to claim 3 wherein said piston is of stepped configuration having a relatively large diameter section and a relatively smaller diameter section.

11. A rotary index table according to claim 10 wherein said outer raceway comprises a ring portion fixed to said top plate and extending into the space whereat said step in said piston is located and wherein said groove formed on said piston is comprised of said smaller diameter portion of said section of said piston extending within said groove ring.

12. The rotary index table according to claim 11 wherein said ring portion of said top plate extends axially towards said fixed base structure and immediately adjacent said skirt portion of said top plate whereby said groove is positioned adjacent to said coupling serrations to minimize said distance between said point of application of said releasing and engagement of said locking forces and said coupling serrations.

13. A rotary index table comprising:
a generally circular top plate;
a fixed base structure; and
means for supporting said top plate for rotation about an axis;
indexing-locating means selectively operable to positively locate said top plate with respect to fixed base structure in each of a plurality of rotary positions of said top plate about said axis, said means including means for relatively moving said top plate and said fixed base structure axially, and further including coupling serrations extending peripherally about said top plate and said fixed base structure and movable into and out of engagement upon said relative axial movement therebetween;
means for imposing a releasing force and an engaging force on said top plate tending to move said top plate to said disengaged position, said means including fluid pressure actuator means tending to produce said relative movement to said disengaged position, including a piston slidably mounted in said fixed base structure for movement along said axis of rotation of said top plate and means for drivingly connecting said top plate and said piston for axial movement together, including rotary bearing means supporting said top plate on said piston, and also including means for applying a fluid pressure to said piston tending to move said piston and top plate to cause separation of said coupling serrations; and spring bias means urging said rotary index table to said locked position whereby upon successation of the application of fluid pressure through said fluid pressure actuator means, said top plate is positively located with respect to said fixed base structure with said spring bias engagement force acting thereon, said spring bias means including a plurality of anchoring plugs disposed about said axis of rotation of said top plate and extending in an axial direction, said anchoring plugs fixed to said fixed base structure and extending into said piston, said spring means also including springs acting between each of said anchoring plugs and said piston to produce said engagement force acting on said piston.

14. The rotary index table according to claim 13 wherein said coupling serrations are located about the periphery of said top plate and said fixed base structure in location into said coupling serrations to thereby minimize the distortion of said top plate.

15. The rotary index table according to claim 14 further including proximity sensor means mounted to said fixed base structure having a probe extending into said fluid actuation chamber at a point adjacent said working face of said piston; means for detecting movement of said piston to said position corresponding to said coupling disc engaged position whereby said position of said piston is detected in order to determine if said top plate is moved to said disengaged position.

* * * * *

UNITED STATES PATENT AND TRADEMARK OFFICE
CERTIFICATE OF CORRECTION

PATENT NO. : 4,353,271
DATED : October 12, 1982
INVENTOR(S) : Daniel Joseph Pieczulewski It is certified that error appears in the above-identified patent and that said Letters Patent is hereby corrected as shown below:

Column 3, Line 51, after "20" insert ---- is ----

Column 3, Line 52, delete "22" insert ---- 21 and ----

Column 3, Line 52, delete "providing" insert ---- provides ----

Signed and Sealed this

Seventeenth Day of May 1983

[SEAL]

Attest:

DONALD J. QUIGG

Attesting Officer   Acting Commissioner of Patents and Trademarks